Jan. 18, 1966 W. LIBEN 3,230,446
RATIO COMPUTING IONIZATION GAUGE
Filed Feb. 12, 1962

INVENTOR.
WILLIAM LIBEN
BY Herman L. Gordon
ATTORNEY

United States Patent Office 3,230,446
Patented Jan. 18, 1966

3,230,446
RATIO COMPUTING IONIZATION GAUGE
William Liben, 11404 Monticello Ave., Silver Spring, Md.
Filed Feb. 12, 1962, Ser. No. 172,722
6 Claims. (Cl. 324—33)

This invention relates to pressure-measuring devices, and more particularly to devices of the ionization gauge type for measuring the pressure of residual gases remaining in a container after a vacuum has been substantially produced therein.

A main object of the invention is to provide a novel and improved ionization gauge device which is relatively simple in construction, which provides accurate readings, and which is less cumbersome and unwieldy than the ionization gauges heretofore employed.

A further object of the invention is to provide an improved apparatus for measuring the pressure of residual gases remaining in a container after a vacuum has been substantially produced therein, the apparatus comprising relatively inexpensive components, being stable in operation, and being protected against damage from large increases in pressure in the container.

A still further object of the invention is to provide an improved pressure-measuring device of the ionization gauge type for measuring the pressure of residual gases remaining in a container or enclosure after it has been exhausted substantially to a vacuum condition, the device being arranged to accurately compute said residual pressure in accordance with an ionization current in an ionization chamber connected to the container or enclosure without the necessity of modulating the power applied to the filament element of the ionization chamber.

A still further object of the invention is to provide an improved ionization gauge device for measuring low pressures, the device being usable over a relatively wide pressure range and having a calibration which is compressed at the upper end of its scale but which is substantially linear at the low pressure portion of its scale.

Further objects and advantages of the invention will become apparent from the following description and claims, and from the accompanying drawings, wherein:

A method commonly employed to measure the pressure of the residual gases remaining in a container after a near-vacuum has been produced therein is to use a device known as an ionization gauge.

Figure 1:
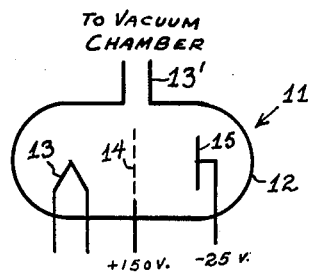
FIGURE 1 is a diagram of an ionization chamber of the type employed in the pressure gauge device of the present invention.

Such a device is illustrated diagrammatically in FIGURE 1 at 11, and comprises a vessel 12 connected to the container by a conduit 13' and containing a filamentary cathode 13 heated by a suitable source of current to a temperature such that it becomes an emitter of electrons. The vessel 12 contains a grid 14 placed at a suitable positive potential relative to cathode 13, for example, about 150 volts, and a plate or collector 15, which is maintained at a potential which is negative with respect to cathode 13, for example, 25 volts negative. The grid 14 accelerates the electrons emitted by cathode 13 so that they enter the space between grid 14 and plate 15. The electrons collide with a fraction of the residual molecules in the space between grid 14 and plate 15 and ionize some of them; eventually they are collected by grid 14. The ions are attracted to plate 15, thus producing a positive ion current which is proportional to the residual gas pressure and the electron current collected by grid 14. In other words, the pressure $p$ is proportional to the ratio of the ion current $i_0$ collected by plate 15 and the electron current $I$ collected by grid 14, according to the following:

$$p = M \frac{i_0}{I}$$

where $M$ is a constant.

In the usual arrangement heretofore employed, the circuit is arranged to utilize the electron current $I$ to control the filament power in a manner to maintain a constant electron current. The pressure $p$ is then proportional to the ion current $i_0$. The present invention provides a means to compute this ratio $(i_0/I)$ directly and to therefore eliminate the necessity of modulating the filament power to maintain constant grid current.

Figure 2:
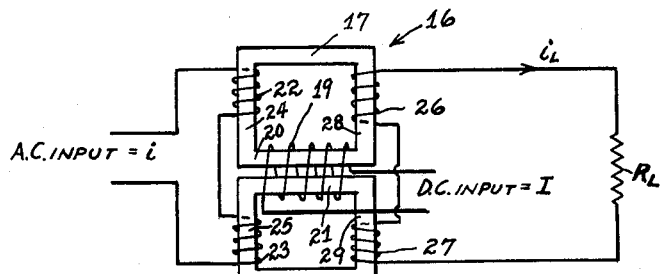
FIGURE 2 is a schematic diagram of a computing circuit for directly computing the ratio of ion current to grid electron current, as employed in a pressure-measuring device according to the present invention.

FIGURE 2 diagrammatically illustrates a device which is arranged to perform the required computation. The computing device is designated generally at 16 and comprises a pair of identical iron cores 17 and 18. A common winding 19 of $N_1$ turns surrounds a pair of adjacent legs 20 and 21 of the generally rectangular cores 17 and 18. Respective identical windings 22 and 23 of $N_2$ turns are wound on side legs 24 and 25 of said cores and are so connected that the voltages they induce in winding 19 are opposite in phase and therefore cancel out. Respective additional identical windings 26 and 27 of $N_3$ turns are wound on the opposite side legs 28 and 29 of said cores and are so connected that the voltages induced in them are in phase, and when connected to a load $R_L$, as shown in FIGURE 2, produce a current $i_L$ in the load.

If a direct current $I$ is applied to winding 19 and an alternating current $i = i_0 \sin wt$ is applied to series-connected windings 22 and 23 in FIGURE 2, the load current $i_L$ will be given by:

$$i_L = \frac{-2_3 A a w N_2 i_0 \cos wt \cdot 10^{-8}}{R_L[(Dw)^2 + (N_1 I)^2]^{1/2}}$$

where:

$A$ is the cross-sectional area of each magnetic core,
$w$ is the angular velocity of the current $i$,
$t$ is the time,
$R_L$ is the load resistance, and $$D = \frac{2 N_3^2 A a}{R_L \cdot 10^8}$$

where
$a$ is a constant derived from the magnetization curve of the core iron and is defined by $CH = e^{B/a}$, where $e$ is the Naperian base, $H$ is the applied magnetic field, $B$ is the induced intensity of magnetization, and $C$ is a constant.

In the above equation for $i_L$, it can be seen that if $(Dw)^2$ is small enough to be negligible as compared to $(N_1 I)^2$, then $i_L$ can be written as:

$$i_L = \frac{-2 N_3 N_2 A a w \cdot 10^{-8}}{N_1 R_L} \cdot \frac{i_0 \cos wt}{}$$

or $i_L = Kp \cos wt$, where K is a constant for the gauge and magnetic computer, since the pressure $p$ is proportional to the ratio $i_0/I$.

Figure 3:
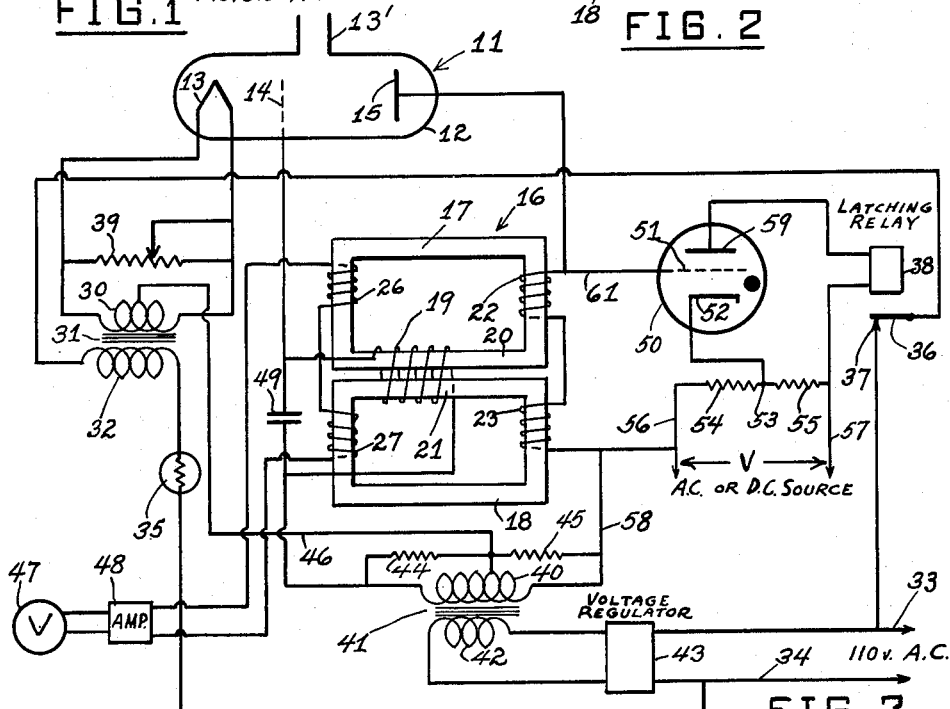
FIGURE 3 is a schematic diagram illustrating the circuit of a device for measuring residual gas pressure in an evacuated chamber or enclosure according to the present invention.

A circuit for measuring the residual gas pressure in vessel 12 using the magnetic ratio computer of FIGURE 2 is illustrated in FIGURE 3. The filamentary cathode 13 is heated by current from the secondary 30 of a transformer 31. The primary 32 of said transformer is connected to a pair of alternating current supply wires 33 and 34 through a ballast tube 35, employed to maintain constant primary current, and the normally closed contacts 36, 37 of a latching relay 38. A potentiometer 39 is connected between cathode 13 and secondary 30 to adjust the voltage applied to the cathode so that for a specific primary current and ballast tube 35 the emission of cathode 13 does not exceed a predetermined safe value. The voltage here applied to grid 14 and plate 15 is an alternating voltage from the secondary 40 of a transformer 41. The primary 42 of this transformer is connected to the supply wires 33 and 34 through a voltage regulator 43, whereby to stabilize the output voltage of transformer 41.

An alternate way to stabilize the voltage output of transformer 41 is to use ballast tubes in series with the transformer primary leads to insure constant primary current.

Fixed resistors 44 and 45 are connected in series across secondary 40. These resistors are preferably sufficiently low in value to draw a current which is large compared to the currents drawn by grid 14 and plate 15.

As shown, a tap of secondary 40 is connected to the center tap of secondary 30 by a conductor 46, which is also connected to the common junction of resistors 44 and 45. The grid 14 is connected to one terminal of secondary 40 through the winding 19. The plate 15 is connected to the other terminal of secondary 40 through the series-connected windings 22 and 23. The series-connected windings 26 and 27 are connected to a meter 47 through a suitable amplifier 48.

Since alternating voltages are applied to grid 14 and plate 15, the respective grid and plate currents are pulse currents. To insure that only the D.C. component of the grid current passes through winding 19, a relatively large capacitor 49 is connected across said winding.

The resultant output voltage across windings 26 and 27 is amplified by the amplifier 48 and applied to meter 47, whose indication is a function of the residual gas pressure in vessel 12.

To prevent the burning up of filamentary cathode 13 by the accidental rise of the gas pressure to a large value, a means is provided to open the filament circuit at relay contacts 36, 37. A thyratron tube 50 has its grid 51 connected by a wire 61 to the plate terminal of winding 22 and its cathode 52 connected to the junction 53 of a pair of series-connected resistors 54 and 55 connected across a pair of bias voltage supply wires 56 and 57. A suitable voltage source is connected to said supply wires, providing a bias voltage V. The terminal wire 58 of secondary 40 is connected to wire 56. The plate 59 of the thyratron tube 50 is connected to wire 57 through the winding of relay 38. If the ion current at the plate 15 exceeds a predetermined safe value, the voltage on grid 51 rises sufficiently to trigger the thyratron tube, causing it to fire and to energize the latching relay 38, which locks contacts 36, 37 in open position and thereby turns off filament 13.

The bias supply voltage V may either be a D.C. voltage, or an alternating voltage which is properly phased with respect to the pulsed voltage across windings 22, 23.

In the system of FIGURE 3, it will be apparent that if the emission of cathode 13 varies, the currents collected by grid 14 and plate 15 will vary accordingly (with the pressure assumed to be constant) and the resultant output voltage developed by windings 26 and 27 (proportional to the ratio of ion current to plate current) will not be changed. This will occur as long as the electron current collected by grid 14 is not so small as to violate the requirement that $(N_1 I)^2$ is substantially greater than $(Dw)^2$.

In the arrangement illustrated in FIGURE 3, the current collected by plate 15 is pulsed. The pulsed current may be employed as shown, or alternatively, the fundamental thereof may be filtered out and applied to the windings 22 and 23.

In the above described system, as the pressure decreases, the output signal to meter 47 also decreases. If necessary, the gain of amplifier 48 may be increased to maintain a sufficient signal to actuate meter 47 for all working values of the pressure $p$.

The gain control of the amplifier may be suitably calibrated to give direct readings of pressure for a constant indicated signal level on meter 47.

Figure 4:
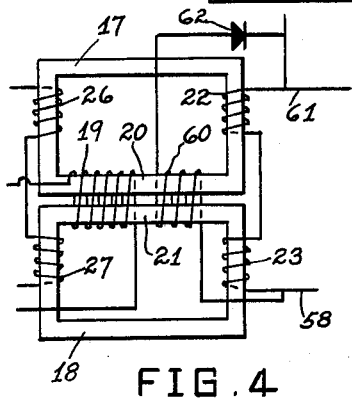
FIGURE 4 is a schematic diagram of a fragmentary portion of the circuit of a pressure-measuring device according to this invention, showing a modification thereof for providing a calibration which is compressed at the upper end of its pressure-measuring range.
Figure 5:
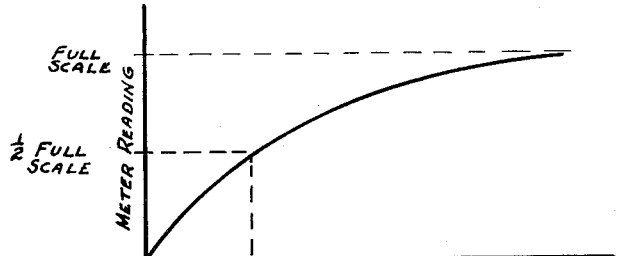
FIGURE 5 is a graph illustrating a typical calibration curve for a device according to this invention employing the structure shown in FIGURE 4.

It is often desirable to increase the usable pressure range displayed on the meter 47 so that the calibration is compressed at the upper end of the pressure scale, as shown in FIGURE 5. With this type of calibration, the system response is almost linear at low pressure and is compressed at higher pressures. The system of FIGURE 3 may be modified to provide this type of calibration in the manner illustrated in FIGURE 4.

In FIGURE 4, an additional winding 60 is provided on the adjacent core legs 20, 21 and is connected across the wires 61 and 58 through a rectifier 62, whereby to by-pass the series-connected windings 22, 23 and thus receive the D.C. component of a fraction of the collector ion current $i_0$.

The indicated current output $I_L$ under these conditions can be expressed by:

$$I_L = \frac{K'(1-f) I_0}{N_1 I + f N_1' I_0}$$

where

K' is a computer constant,
$f$ is the fraction of the effective value of the ion current $I_0$ by-passed to coil 60, and
$N_1'$ is the number of turns of coil 60

This can be written as:

$$I_L = \frac{K'' I_0}{I_0 + N_1 \frac{I}{f N_1'}}$$

where

I is the electron current collected by grid 14, and
K'' is another constant expressed by $$K'' = \frac{K'(1-f)}{f N_1'}$$

But, since $$I = \frac{M' I_0}{p}$$

where M' is a constant, $$I_L = \frac{K'' I_0}{I_0 + \frac{N_1}{f N_1'} \cdot \frac{M' I_0}{p}}$$

or $$I_L = \frac{K''}{1 + \frac{N_1 M'}{f N_1'} \cdot \frac{1}{p}}$$

If the midscale value of the pressure range shown on meter 47 is $p_{ms}$ and the device is designed so that the constant quantity $$\frac{N_1 M'}{f N_1'} = p_{ms}$$

then $$I_L = \frac{K''}{1 + \frac{p_{ms}}{p}}$$

or $$I_L = \frac{K''p}{p + p_{ms}}$$

From the above equation for $I_L$ it can be seen that the meter reading $I_L$ at small values of $p$ is substantially proportional to $$\frac{K''p}{p_{ms}}$$

namely, is substantially proportional to $p$; when $p = p_{ms}$ (at the midscale value), $$I_L = \frac{K''}{2}$$

when $p$ is relatively large, $I_L$ approaches the value of $K''$ (the full scale value). This results in a calibration similar to that shown in FIGURE 5.

While certain specific embodiments of an improved ionization gauge device have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination, an ionization chamber adapted to be connected to a container, a cathode, a grid and a plate in said chamber, means producing a flow of electron current between the cathode and grid and a flow of ionization current in the space between said grid and plate responsive to the presence of residual gas in said chamber, and a ratio computing transformer having input windings connected respectively between the grid and cathode and between the plate and cathode and having an output winding and voltage indicating means connected to said output winding, said windings being arranged to directly compute the ratio of ionization current to grid electron current and to deliver a voltage to said indicaitng means which is substantially proportional to the pressure of said residual gas.

2. In combination, an ionization chamber adapted to be connected to a container, a cathode, a grid and a plate in said chamber, means producing a flow of electron current between the cathode and grid and a flow of ionization current in the space between said grid and plate responsive to the presence of residual gas in said chamber, a ratio computing transformer having respective input windings connected between the grid and cathode and the plate and cathode and an output winding, and pressure indicating means connected to said output winding, said input windings being arranged to directly compute the ratio of ionization current to grid electron current and to induce an output signal in said output winding in accordance with said ratio, whereby to indicate the pressure of said residual gas.

3. In combination, an ionization chamber adapted to be connected to a container, a cathode, a grid and a plate in said chamber, a heating circuit operatively associated with said cathode, means producing a flow of electron current between the cathode and grid and a flow of ionization current in the space between said grid and plate responsive to the presence of residual gas in said chamber, a ratio computing transformer having respective input windings connected between the grid and cathode and the plate and cathode and an output winding, pressure indicating means connected to said output winding, said input windings being arranged to directly compute the ratio of ionization current to grid electron current and to induce an output signal in said output winding in accordance with said ratio, whereby to idicate the pressure of said residual gas, and means to open said heating circuit when the ionization current exceeds a predetermined value.

4. In combination, an ionization chamber adapted to be connected to a container, a cathode, a grid and a plate in said chamber, means producing a flow of electron current between the cathode and grid and a flow of ionization current in the space between said grid and plate responsive to the presence of residual gas in said chamber, a ratio computing transformer having respective input windings connected between the grid and cathode and the plate and cathode and an output winding, pressure indicating means connected to said output winding, said input windings being arranged to directly compute the ratio of ionization current to grid electron current and to induce an output signal in said output winding in accordance with said ratio, whereby to indicate the pressure of said residual gas, and means to by-pass a portion of the ionization current and to modify the input provided by the grid current therewith, whereby to modify the calibration of the pressure indicating means.

5. In combination, an ionization chamber adapted to be connected to a container, a cathode, a grid and a plate in said chamber, means producing a flow of electron current between the cathode and grid and a flow of ionization current in the space between said grid and plate responsive to the presence of residual gas in said chamber, a magnetic core structure having two magnetic core elements with a pair of adjacent legs, a first input winding on said pair of adjacent legs connected in circuit with the grid, serially connected opposing second input windings wound respectively on the two core elements and connected in circuit with the plate, serially connected assisting output windings wound respectively on said two core elements, and pressure indicating means connected to said output windings, said input windings being arranged to compute the ratio of ionization current to grid electron current and to induce an output signal in said output windings in accordance with said ratio, whereby to indicate the pressure of said residual gas.

6. The structure of claim 5, and a further winding on said adjacent legs, and means to by-pass a portion of the ionization current through said further winding to modify the magnetization provided by said first input winding, whereby to modify the calibration of the pressure indicating means.

References Cited by the Examiner

UNITED STATES PATENTS

| 2,375,280 | 5/1945 | Calbick | 324—33 X |
| 2,442,518 | 6/1948 | Stratton | 324—33 |
| 2,735,062 | 2/1956 | Striker | 324—33 |
| 3,058,057 | 10/1962 | Frost | 324—33 |

OTHER REFERENCES

Hariharan et al.: The Review of Scientific Instrument, Q184.R5, July 1956, 324–33, vol. 27, No. 7, pp. 448 and 449.

Shutten, J.: Applied Scientific Research, section B, vol. 6, No. 4, 1957, pp. 276 to 284, QC1.A75.

WALTER L. CARLSON, *Primary Examiner.*